UNITED STATES PATENT OFFICE.

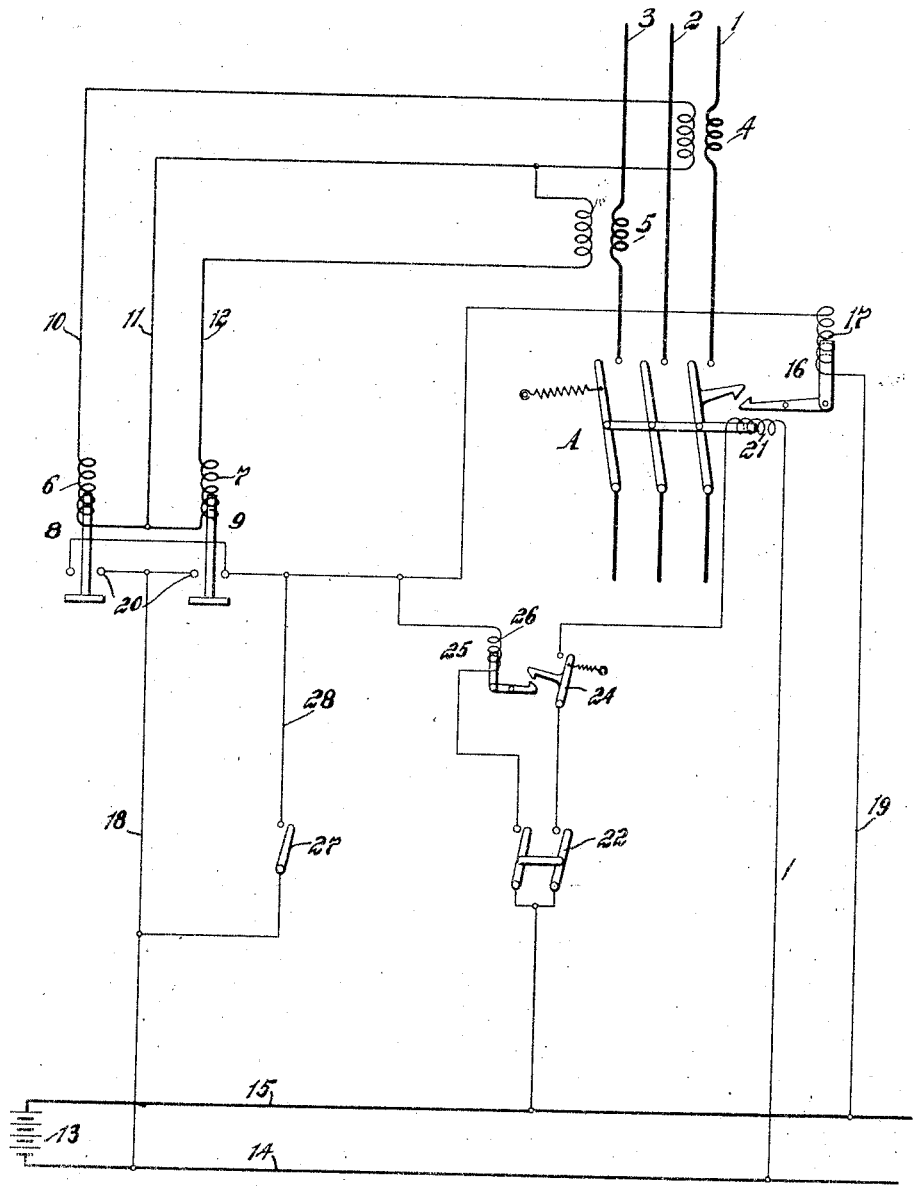

HERMON L. VAN VALKENBURG, OF NORWOOD, OHIO, ASSIGNOR TO BULLOCK ELECTRIC MANUFACTURING COMPANY, A CORPORATION OF OHIO.

ELECTRICALLY-OPERATED CIRCUIT-BREAKER.

987,775.  Specification of Letters Patent.  Patented Mar. 28, 1911.

Application filed October 27, 1905. Serial No. 284,743.

*To all whom it may concern:*

Be it known that I, HERMON L. VAN VALKENBURG, a citizen of the United States, residing at Norwood, in the county of Hamilton and State of Ohio, have invented certain new and useful Improvements in Electrically-Operated Circuit-Breakers, of which the following is a full, clear, and exact specification.

My invention relates to circuit-breakers and especially to the electrically operated type.

An electrically operated circuit-breaker is closed by some electro-magnetic mechanism as an ordinary motor, a solenoid or some other type of magnet, the movable member of which is connected in some manner to the movable part of the circuit-breaker. The coil or coils of the operating mechanism are connected by a switch to any desired source of current. When it is desired to close the breaker this switch is closed. As long as this switch remains closed and the circuit is completed through the coil or coils of the closing mechanism the circuit-breaker will be held in its closed position, irrespective of the action of any tripping or releasing mechanism. Thus if the circuit-breaker is closed and maintained closed in this manner while an overload or short circuit exists, great damage may result to the apparatus connected to the distributing mains.

The object of my invention is to provide means for automatically breaking the circuit through the coil or coils of the closing or operating mechanism in case the overload exists when the switch in the circuit of the coil of the operating mechanism is closed.

In carrying out my invention, I provide in the circuit of the coil of the closing mechanism of an electrically operated switch or circuit-breaker, an auxiliary switch or circuit-breaker for automatically opening the said circuit in case the latter is closed while an overload exists on the main line.

More specifically considered, my invention consists in a circuit-breaker having a closing magnet and a tripping magnet, a switch for completing the circuit through the closing magnet, and an auxiliary circuit-breaker having a tripping coil connected to the switch and having a circuit which is adapted to be closed by an overload-relay connected to the main circuit, whereby the circuit through the closing magnet will be broken in case the switch is closed when an overload exists on the main circuit.

My invention still further consists in the combinations of elements and arrangements of circuits described in the specification and set forth in the appended claims.

My invention is not limited to any particular type of closing mechanism. A magnet or solenoid having a reciprocating armature connected to the circuit-breaker may be employed for closing the latter. In this case, by closing the circuit through the coil of the magnet by an ordinary switch, the breaker can be closed. In case the magnet circuit is maintained closed the circuit-breaker may be thereby held in its closed position although an overload may exist on the main line. By placing an auxiliary circuit-breaker in the circuit of the magnet, this circuit can be immediately broken in case an overload exists. Hence, the main circuit-breaker can never be held in its closed position for any length of time while an overload exists. An ordinary motor, having a rotary armature connected in any manner to the movable member of the circuit-breaker, can also be employed for operating the breaker. By placing an auxiliary circuit-breaker in the motor circuit, the latter circuit can be opened in case of overload. In the description and claims I intend the word magnet to include also the ordinary solenoid magnet.

For a better understanding of my invention reference is had to the accompanying drawing which shows diagrammatically the circuits and switches arranged in accordance with my invention. I have shown at 1, 2 and 3, the mains of a three-phase circuit, in which is located a three-pole circuit-breaker A. While I have shown a three-phase circuit, it is to be understood that the application of my invention is not limited to a circuit of this type, but my invention may be used in an alternating current circuit of any number of phases or in a direct current circuit. In case the circuit-breaker A is located in a direct current main, a single overload coil located directly in the main would be employed. In two of the mains 1 and 3, are two series transformers 4 and 5, the secondaries of which are connected to the coils 6 and 7 of the overload relays 8 and 9 by conductors 10, 11 and 12.

For the sake of clearness, a battery 13 having mains or leads 14 and 15 is shown for supplying current to the circuit controlling members. The solenoid for tripping or releasing the circuit-breaker A is shown at 16 and has a coil 17 connected to the battery mains 14 and 15, by conductors 18 and 19. The circuit of this solenoid is normally open and is adapted to be closed by the relays 8 and 9. The contacts 20 are so arranged that the circuit through the coil of the tripping solenoid 16 can be completed by either of the relay-solenoids 8 and 9. Thus the circuit-breaker A will be opened in case the overload or short circuit occurs in any of the phases. As is shown in the drawing, the circuit-breaker is held in the closed position until an overload occurs and the coil 17 is energized, when the core of the solenoid 16 will be operated to release the circuit-breaker. I have in this instance shown a solenoid 21 for closing the circuit-breaker A. The coil of this solenoid is connected across the mains 14 and 15 of the battery, through the ordinary closing switch 22. The core of the solenoid 21 is connected to the movable member of the circuit-breaker A. The coil of this solenoid is con said coil is completed, circuit-breaker A will be closed. The arrangements of circuits and switches so far described are old and I claim no novelty therein. It will also be seen that unless some means is provided for interrupting the circuit through the coil of the solenoid 21, the circuit-breaker will be held in its closed position as long as the switch 22 is closed, regardless of the fact that the overload in the mains may continue.

I provide means whereby the circuit through the coil of the closing member 21 will be immediately broken and the circuit-breaker A opened in case the latter is closed while the overload continues. With this end in view I insert in the circuit of the closing member 21, an auxiliary switch or circuit-breaker 24, which is provided with a tripping or releasing solenoid 25, the coil 26 of which is connected in this case to the switch 22 and the circuit of the coil 17 of the releasing solenoid 16 for the main circuit-breaker A. It will be seen that when the switch 22 is closed, and the circuit through the main releasing or tripping coil 17 is completed as is always the case when an overload exists, the coil 26 will be energized. Before the circuit-breaker A can be closed by operating the switch 22 the switch 24 must first be closed. The result is that if the circuit-breaker A is closed by closing the switch 22 while the overload exists, the solenoid 25 will immediately open the switch or circuit-breaker 24 and break the circuit through the coil of the closing member 21. Thus the circuit-breaker will be opened at once and no damage can be done to the apparatus.

I have shown at 27 a switch located in a conductor 28, which bridges the contacts adapted to be closed by the relay-plungers. Thus by means of the switch 27 the circuit-breaker A can be opened at will.

I do not wish to be confined to the specific arrangements of circuits shown and described, nor to any particular types of switch or circuit-breakers, as many changes could be made without departing from the spirit of my invention. I aim in my claims to cover all such changes or modifications.

What I claim as new and desire to secure by Letters Patent is:—

1. In combination, main circuit conductors, a circuit-breaker having movable and stationary contact members, automatic tripping or releasing mechanism for said circuit-breaker, an electromagnetic device for closing the movable member of said circuit-breaker, a switch in a circuit of said device, and means for automatically opening said switch, said means being dependent on the energization of said circuit of said electromagnetic device while an overload exists in the main circuit.

2. In combination, main circuit conductors, a circuit-breaker having movable and stationary contact members, an automatic tripping or releasing mechanism for said circuit-breaker, a magnet for closing the contact members of said circuit-breaker, a switch in circuit with the coil of said magnet, and a tripping magnet which when energized causes the opening of said last-named switch and which is energized only in case the circuit through the closing magnet is completed during the existence of an overload in the main circuit.

3. In combination, main circuit-conductors, a circuit-breaker, a magnet for closing the movable member thereof, means for tripping said movable member, a switch for closing the circuit through the coil of said closing magnet, and means for automatically interrupting said circuit, said means being dependent on having said switch closed while an overload exists on the main circuit.

4. In combination, a circuit-breaker having a closing magnet, means for automatically opening said circuit-breaker, a switch for completing the circuit through said closing magnet to close the circuit-breaker, and an auxiliary circuit-breaker which operates to break the circuit of the coil of said closing magnet, said auxiliary circuit-breaker being dependent upon the existence of an overload while said switch is closed.

5. In combination, main circuit-conductors, a circuit-breaker having a closing magnet and a tripping or releasing magnet, means including an auxiliary circuit-breaker for connecting the closing magnet to a source of current supply, and a tripping coil for said auxiliary circuit-breaker which is dependent for its operation both on the energization of the circuit of said closing magnet and the existence of an overload in the main circuit.

6. In combination, main circuit-conductors, a circuit-breaker having a closing magnet and a tripping or releasing magnet, a switch for connecting said closing magnet to a source of current supply, an auxiliary electromagnetic circuit-breaker in circuit with said switch and closing magnet and dependent for its operation both on the closed condition of said switch and the existence of an overload in the main circuit.

7. In combination, main circuit conductors, a circuit-breaker, a tripping or releasing magnet for said circuit-breaker, a magnet for closing said circuit-breaker, a switch in the circuit of the coil of said closing magnet, a tripping magnet for said switch, an overload relay responsive to the current in the main circuit and operating upon excessive current to complete the circuit of the first mentioned tripping magnet, and also that of the second provided the circuit of said closing magnet is energized.

8. In combination, main circuit conductors, a circuit-breaker having a closing magnet and a tripping or releasing magnet, and a switch and an auxiliary circuit-breaker in circuit with the closing magnet, said auxiliary circuit-breaker having a tripping coil connected to said switch and to the circuit of said first mentioned tripping coil whereby the circuit through the closing magnet will be broken when the latter is energized at the time an overload exists in the main circuit.

9. In combination, main circuit-conductors, a circuit-breaker having a closing solenoid and a tripping or releasing solenoid, an overload relay for closing the circuit through the coil of the tripping solenoid, and a switch and an auxiliary circuit-breaker in circuit with the closing solenoid, said auxiliary circuit-breaker having a tripping coil connected to one member of the switch and to the circuit of the first named tripping solenoid so that the circuit through the coil of the closing solenoid will be broken if an overload occurs in the main circuit when the switch is closed.

10. In combination, an electric circuit, an electromagnetic circuit-breaker therein, electromagnetic means for closing said circuit-breaker, manually controlled means for causing the energization of said electromagnetic means, and means separate from the circuit-breaker and arranged to cause the deënergization of said electromagnetic closing means only when the latter is energized while there is an overload on the circuit.

11. In combination, main circuit conductors, a circuit-breaker having a closing magnet and a tripping magnet, an overload relay responsive to the current in said conductors and having its contacts connected in the circuit of said tripping magnet, a switch and an auxiliary circuit-breaker in the circuit of said closing magnet, and a tripping coil for said auxiliary circuit-breaker arranged to be energized when both said overload relay and said switch are closed.

12. In combination, a circuit-breaker arranged to be opened automatically upon the occurrence of predetermined abnormal conditions, power-operated means for closing said circuit-breaker, means for admitting energy to operate said power-operated means, and means for automatically disconnecting such supply of energy, said last named means being dependent upon the existence of the aforesaid predetermined abnormal conditions during the supply of energy to said power-operated means.

13. In combination, main circuit-conductors, a circuit-breaker having a tripping or releasing magnet, power-operated means for closing said circuit-breaker, means for admitting energy to operate said power-operated means, and automatic means for shutting off the supply of energy to said power-operated means, said automatic means requiring for its operation both that the said tripping magnet be energized and that said energy-admitting means be in energy-admitting position.

14. In combination, a circuit-breaker which is tripped automatically upon the occurrence of predetermined abnormal conditions, power-operated means for closing said circuit-breaker, two devices through which the energy for operating said power-operated means passes in series, one of said devices being arranged to shut off such supply of energy in case the other of said devices is in a position to admit energy at the same time that such predetermined abnormal conditions exist.

15. In combination, a circuit-breaker which is tripped automatically upon the occurrence of predetermined abnormal conditions, power-operated means for closing said circuit-breaker, two devices through which the energy for operating said power-operated means passes in series, one of said devices being hand-operated and the other being automatically moved out of energy-admitting position in case the manually operated device is in energy-admitting position at the same time that such predetermined abnormal conditions exist.

16. In combination, a circuit-breaker arranged to be opened automatically upon the occurrence of predetermined abnormal conditions, power-operated means for closing said circuit-breaker, means for admitting energy to operate said power-operated means, and means for automatically causing the shutting off of the supply of energy to said power-operated means in case energy is being supplied thereto simultaneously with the existence of such predetermined abnormal conditions.

In testimony whereof I affix my signature, in the presence of two witnesses.

HERMON L. VAN VALKENBURG.

Witnesses:
FRED J. KINSEY,
GEORGE J. SCHWARTZ.

---

Correction in Letters Patent No. 987,775.

It is hereby certified that in Letters Patent No. 987,775, granted March 28, 1911, upon the application of Hermon L. Van Valkenburg, of Norwood, Ohio, for an improvement in "Electrically-Operated Circuit Breakers," an error appears in the printed specification requiring correction as follows: Page 2, line 31, the period and the words "The coil of this solenoid is con-" should be stricken out and a comma and the words *and when the circuit through the* inserted instead; and that the said Letters Patent should be read with this correction therein that the same may conform to the record of the case in the Patent Office.

Signed and sealed this 6th day of June, A. D., 1911.

[SEAL.]

C. C. BILLINGS,
*Acting Commissioner of Patents.*